United States Patent [19]
Anselmino

[11] 3,826,933
[45] July 30, 1974

[54] MOUNTING SYSTEM FOR REAR WHEEL ANGULAR SPEED DETECTORS FOR MOTOR VEHICLES

[75] Inventor: Giovanni Anselmino, Turin, Italy

[73] Assignee: Fiat Societa per Azioni, Turin, Italy

[22] Filed: Dec. 13, 1972

[21] Appl. No.: 314,641

[30] Foreign Application Priority Data
Dec. 14, 1971 Italy .................................. 71086/71

[52] U.S. Cl. ........................ 310/168, 310/90, 308/1
[51] Int. Cl. ........................................... H02k 19/24
[58] Field of Search ..................... 310/90, 168–170, 310/155, 171, 75, 77; 235/95 B; 324/174; 308/1

[56] References Cited
UNITED STATES PATENTS

| | | | |
|---|---|---|---|
| 3,500,091 | 3/1970 | Jones .................................. | 310/90 |
| 3,604,966 | 9/1971 | Liggett ................................ | 310/168 |
| 3,626,226 | 12/1971 | Pauwels ............................. | 310/168 |
| 3,653,471 | 4/1972 | Burckhardt ........................ | 324/174 |
| 3,716,788 | 2/1973 | Nishida .............................. | 324/174 |
| 3,719,841 | 3/1973 | Ritsema ............................. | 324/174 |

Primary Examiner—R. Skudy
Attorney, Agent, or Firm—Sughrue, Rothwell, Mion, Zinn & Macpeak

[57] ABSTRACT

A driven rear wheel of a vehicle is provided with an angular speed detector comprised of a magnetic pick-up and a phonic wheel rotatable relative thereto. The phonic wheel is secured to the outer ring of a roller bearing supported by an annular flange secured to a wheel bearing retaining ring which in turn is secured to the axle housing. The phonic wheel is provided with a plurality of radially inwardly directed teeth which cooperate with the magnetic pick-up which is secured against rotation radially inwardly of the phonic wheel.

2 Claims, 1 Drawing Figure

PATENTED JUL 30 1974 3,826,933
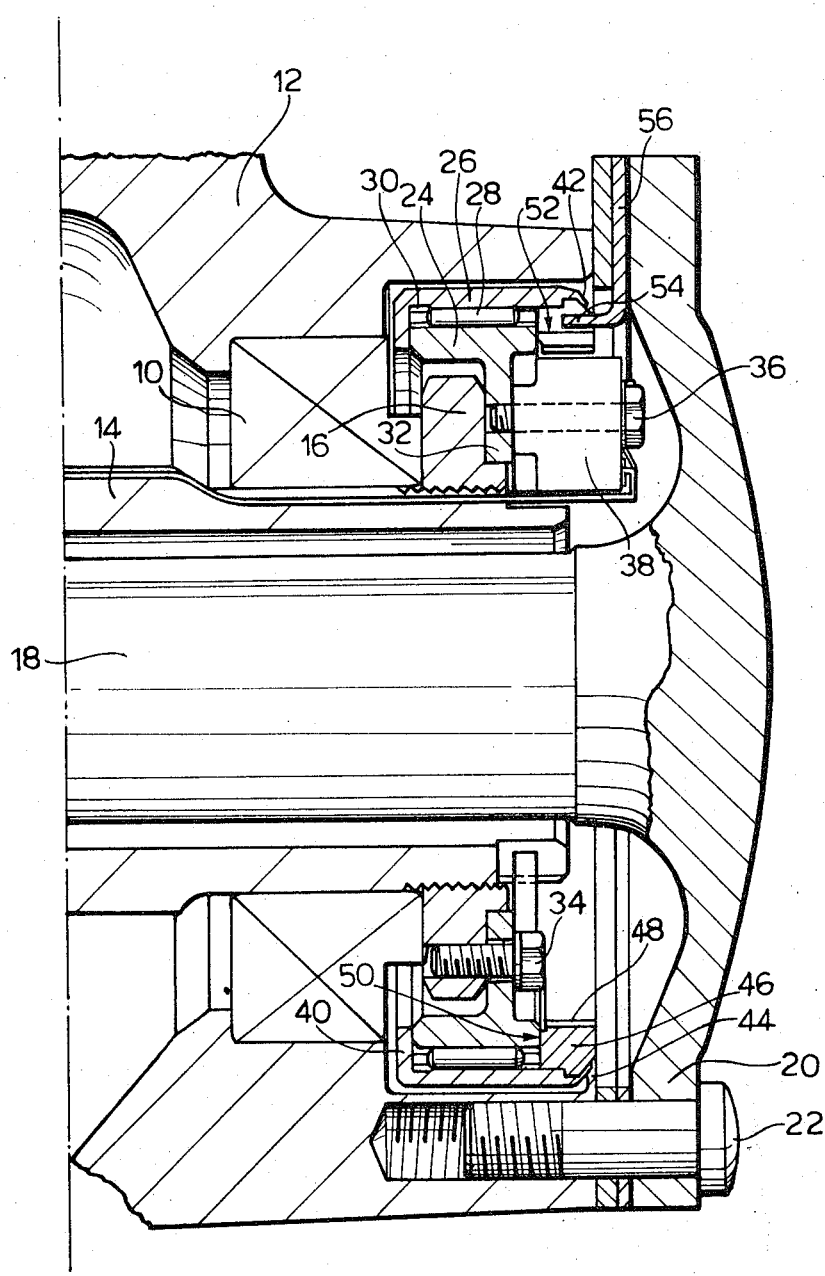

MOUNTING SYSTEM FOR REAR WHEEL ANGULAR SPEED DETECTORS FOR MOTOR VEHICLES

BACKGROUND OF THE INVENTION

This invention relates to a mounting system for angular speed detectors for motor vehicle wheels, particularly for use in vehicle anti-skid braking installations. In particular this invention relates to a mounting system intended to be used for detecting the angular speed of a wheel mounted on a rear axle of a vehicle with rear wheel drive.

In known mountings for angular speed detectors, in particular detectors of the so-called phonic wheel type in which a toothed wheel cooperates with a magnetic pick-up, the phonic wheel is generally mounted on a shaft independently of the vehicle wheel, since otherwise wear in the vehicle wheel bearings could give rise to eccentricity of the axis of the phonic wheel, resulting in cyclic variation of the clearance between the teeth of the phonic wheel and the magnetic pick-up.

Such a known mounting system has been used with the non-driven wheels of a vehicle by fixing the magnetic pick-up to the outside end of the wheel by means of a support on which the phonic wheel is also mounted. The phonic wheel is rotated by a driving device which rotates with the wheel of the vehicle. In the case of the driven wheels of a vehicle, however, in which the wheel hub is in general supported on an axle housing inside which a half-shaft rotates, such a mounting system cannot be used.

In the Applicants' U.S. Pat. application Ser. No. 273,021, filed July 18, 1972, entitled "MOUNTING FOR A SPEED DETECTOR," there is described a mounting system which has the required characteristics of separating the support for the vehicle wheel and the support for the phonic wheel, but in which it is necessary to provide a calibrated mounting of the phonic wheel on a seat provided on the axle housing. Because of the fine tolerances required in the accurate centralisation of the phonic wheel, in order to maintain rigorously constant the clearance between the phonic wheel and the magnetic pick-up, such a mounting system is difficult and inconvenient to realise with precision.

An object of this invention is therefore, the provision of a mounting system for angular speed detectors of the type with a phonic wheel and magnetic pick-up which requires the use of a small number of bolts or screws to fix the already assembled detector to the vehicle, in the case of an axle-driven rear wheels of motor vehicles.

SUMMARY OF THE INVENTION

According to the invention there is provided a mounting system for mounting an angular speed detector on a rear driven wheel of a motor vehicle, of the type having a phonic wheel cooperating with a magnetic pickup, wherein a supporting flange secured to a retaining ring of the outer bearing of the vehicle wheel supports both the magnetic pick-up and a roller bearing having an outer rotatable ring to which the phonic wheel is fixed, the said phonic wheel having radially inwardly facing ferromagnetic teeth and being rotatable with the vehicle wheel.

THE DRAWING

A preferred embodiment of this invention will now be described, merely by way of non-limiting example, with reference to the accompanying drawing, which is a diagrammatic axial section of a mounting system according to said embodiment of the invention.

DETAILED DESCRIPTION OF THE ILLUSTRATED EMBODIMENT

With reference to the drawing, a bearing 10 supporting a hub 12 of a driven rear wheel of a motor vehicle (not shown) is fixed in position on the outer end of a rear axle housing 14 by means of a retaining ring 16 screwed on the said end of the housing. A half-shaft 18 is contained within the housing 14 and has an external flange 20 fixed by means of bolts such as 22 to the hub 12 of the wheel to drive the latter.

A roller bearing of a particular shape comprises an inner ring 24, an outer ring 26, and a number of rollers 28 which are maintained in position by a cage 30 for rolling movement between the two rings. The inner ring 24 has a radially inwardly projecting flange 32 fixed to the wheel bearing retaining ring 16 by means of bolts 34. A magnetic pick-up 38 of known type is attached to the flange 32 by means of bolts 36.

The outer ring 26 is kept in position with respect to the inner ring 24 by a flange 40 formed on one edge of the ring 26 and bearing against one axial end of the inner ring 24. The opposite edge 42 of the outer ring 26 deformed radially inwardly into engagement with a bevelled edge 44 of an annular phonic wheel 46 coaxial with the shaft 18. The phonic wheel 46 is formed with ferromagnetic teeth 48 on its internal circumference. One axial face 50 of the phonic wheel 46 presses against the opposite end of the inner ring 24 to complete the positioning of the outer ring 26. The phonic wheel 46 has a hole 52 in which a tooth 54 engages with a degree of play. The tooth 54 is carried by an annular disc 56 interposed between the flange 20 of the half-shaft 18 and the hub 12 of the vehicle wheel, and therefore rotates the phonic wheel 46 with the vehicle wheel.

It will be evident how the system comprising the phonic wheel 46 and its supporting bearing 24, 26, 28, together with the magnetic pick-up 38, can be set up and assembled entirely on the bench, and subsequently installed on the vehicle by a simple screwing up of the bolts 34.

We claim:

1. A mounting system for mounting an angular speed detector on a rear driven wheel on a motor vehicle of the type wherein the vehicle wheel has an outer bearing including a retaining ring, said mounting system comprising a supporting flange secured to said retaining ring of said outer bearing, a magnetic pick-up carried by said supporting flange, a roller bearing supported by said flange, said roller bearing including an outer ring rotatable relative to said flange, said outer ring having an edge portion, a phonic wheel having an external beveled edge engaged by the edge portion of said outer ring for supporting said phonic wheel for rotation with said outer ring, and means for coupling said phonic wheel to the vehicle wheel for rotation therewith, said phonic wheel having radially inwardly facing ferromagnetic teeth cooperating with said magnetic pick-up.

2. A mounting system as set forth in claim 1 wherein said supporting flange is secured to said retaining ring by means of bolts.

* * * * *